US010129089B1

(12) United States Patent
Lisouski et al.

(10) Patent No.: US 10,129,089 B1
(45) Date of Patent: Nov. 13, 2018

(54) SHIFTING NETWORK TRAFFIC

(71) Applicant: Amazon Technologies, Inc., Seattle, WA (US)

(72) Inventors: Dzianis Lisouski, Dublin (IE); Michal Zygmunt Zawirski, Seattle, WA (US); Robert Kennedy, Seattle, WA (US); Karl Andre McCabe, Dublin (IE); Paul A. Stancik, Seattle, WA (US); Matthew Dean Rehder, Seattle, WA (US); Brian Long, Ashford (IE)

(73) Assignee: Amazon Technologies, Inc., Seattle, WA (US)

( * ) Notice: Subject to any disclaimer, the term of this patent is extended or adjusted under 35 U.S.C. 154(b) by 2 days.

(21) Appl. No.: 14/979,362

(22) Filed: Dec. 22, 2015

(51) Int. Cl.
*H04L 12/24* (2006.01)

(52) U.S. Cl.
CPC .......... *H04L 41/12* (2013.01); *H04L 41/0813* (2013.01)

(58) Field of Classification Search
None
See application file for complete search history.

(56) References Cited

U.S. PATENT DOCUMENTS

| | | | | |
|---|---|---|---|---|
| 7,277,393 | B1 * | 10/2007 | Jacobson | H04L 45/00 370/238 |
| 7,334,047 | B1 * | 2/2008 | Pillay-Esnault | H04L 45/02 709/239 |
| 8,171,111 | B1 * | 5/2012 | Niedzielski | H04L 67/1095 709/219 |
| 2002/0165944 | A1 * | 11/2002 | Wisner | G06F 11/2035 709/220 |
| 2004/0117251 | A1 * | 6/2004 | Charles Shand | G06Q 30/0273 705/14.69 |
| 2004/0228290 | A1 * | 11/2004 | Graves | G06F 17/30067 370/257 |
| 2006/0056411 | A1 * | 3/2006 | Badat | H04L 41/12 370/392 |
| 2006/0182035 | A1 * | 8/2006 | Vasseur | H04L 45/00 370/238 |

(Continued)

FOREIGN PATENT DOCUMENTS

EP 1 638 254 A1 3/2006

OTHER PUBLICATIONS

International Search Report and Written Opinion for PCT/US2016/067591, dated Mar. 9, 2017, 10 pages.

*Primary Examiner* — Benjamin Lamont
(74) *Attorney, Agent, or Firm* — Klarquist Sparkman, LLP

(57) ABSTRACT

A traffic shifting system is described to shift traffic away from one or more network devices or interfaces on those devices. The system ensures that traffic can be safely shifted off of a network device before the shifting occurs. The method is described as broken into several phases for simplicity, such as a discovery phase, a pre-check phase, a shifting phase, and a post-shift phase. Before shifting occurs, the discovery phase is used to obtain network topology and configuration information. In the pre-check phase, that information is interrogated so that a shifting can be performed without negatively impacting the network. If the pre-check phase is passed, then the network shifting can occur through adjustment of configuration parameters, such as a cost parameter. Finally, in the post-shift phase, checks are performed to ensure traffic is shifting away from the network device.

20 Claims, 9 Drawing Sheets

(56) References Cited

U.S. PATENT DOCUMENTS

| | | |
|---|---|---|
| 2006/0195607 A1* | 8/2006 | Naseh .................... H04L 45/00 709/238 |
| 2007/0053300 A1 | 3/2007 | Thu et al. |
| 2008/0192651 A1* | 8/2008 | Gibbings ................ H04L 41/12 370/254 |
| 2010/0034080 A1* | 2/2010 | Charzinski ............ H04L 41/082 370/221 |
| 2010/0094986 A1 | 4/2010 | Zuckerman et al. |
| 2010/0235431 A1* | 9/2010 | Poluri ................. G06F 11/2066 709/203 |
| 2011/0069613 A1* | 3/2011 | Phillips ............... H04L 43/0876 370/229 |
| 2013/0070638 A1* | 3/2013 | Iovanna ................. H04L 41/12 370/254 |
| 2013/0138834 A1* | 5/2013 | Imamura ............... G06F 9/5088 709/242 |
| 2014/0010077 A1* | 1/2014 | Busch .................... H04L 47/12 370/229 |
| 2014/0115135 A1* | 4/2014 | Allan .................. H04L 67/1004 709/223 |
| 2014/0211604 A1* | 7/2014 | Sandick ............. H04L 43/0811 370/216 |
| 2014/0355450 A1* | 12/2014 | Bhikkaji ............... H04L 47/125 370/237 |
| 2015/0092594 A1* | 4/2015 | Zhang .................... H04L 45/12 370/254 |
| 2016/0173199 A1 | 6/2016 | Gupta et al. |
| 2017/0099210 A1 | 4/2017 | Fardid et al. |
| 2017/0155706 A1* | 6/2017 | Hiltunen ............. H04L 67/1002 |

\* cited by examiner

US 10,129,089 B1

SHIFTING NETWORK TRAFFIC

BACKGROUND

Traffic on the Internet has grown dramatically over the last decade and continues to grow. Routers play a critical role in sustaining that growth. Various protocols exist for routers to communicate together. Typically, the protocols allow routers to identify neighbors and costs associated with routing packets to those neighbors. Such information allows the routers to construct a topology map and to select an optimal route for forwarding network packets. Open Shortest Path First (OSPF) is an example of a routing protocol for Internet Protocol networks.

In some cases, for maintenance or other reasons, it is necessary to shift traffic away from a router or a group of routers. Such traffic shifting is often manually accomplished with no set techniques established. More efficient traffic shift options are needed.

DETAILED DESCRIPTION

The embodiments described herein relate to shifting traffic away from one or more network devices. In some instances, it is desirable to remove one or more network devices (e.g., routers, switches, bridges, hubs, etc.) from a network for the purposes of maintenance, updates, replacements, etc. Generally, modifying routing configuration information (e.g., increasing a cost parameter or changing routing policy information) of a network device makes it appear as an unattractive alternative to other network devices. However, adjusting the routing configuration information alone without further checks can cause dramatic network problems. For example, if the network does not have sufficient resources to withstand losing the network device, then adjusting the cost parameter could be detrimental to the overall network functionality.

Consequently, the system ensures that traffic can be safely shifted off of a network device before the shifting occurs. The method is described as broken into several phases for simplicity, such as a discovery phase, a pre-check phase, a shifting phase, and a post-shift phase. Other phases can be added, such as an identification phase, or phases can be eliminated, such as the post-shift phase or the discovery phase. Alternatively, some of the phases described herein can be merged. Before shifting occurs, the discovery phase is used to obtain network topology and configuration information. In the pre-check phase, that information is interrogated to ensure that a shifting can be performed without negatively impacting the network. If the pre-check phase is passed, then the network shifting can occur through adjustment of routing configuration information associated with an interface on any devices for which traffic is being shifted. Finally, in the post-shift phase, checks are performed to ensure traffic is shifting away from the network device.

Figure 1:
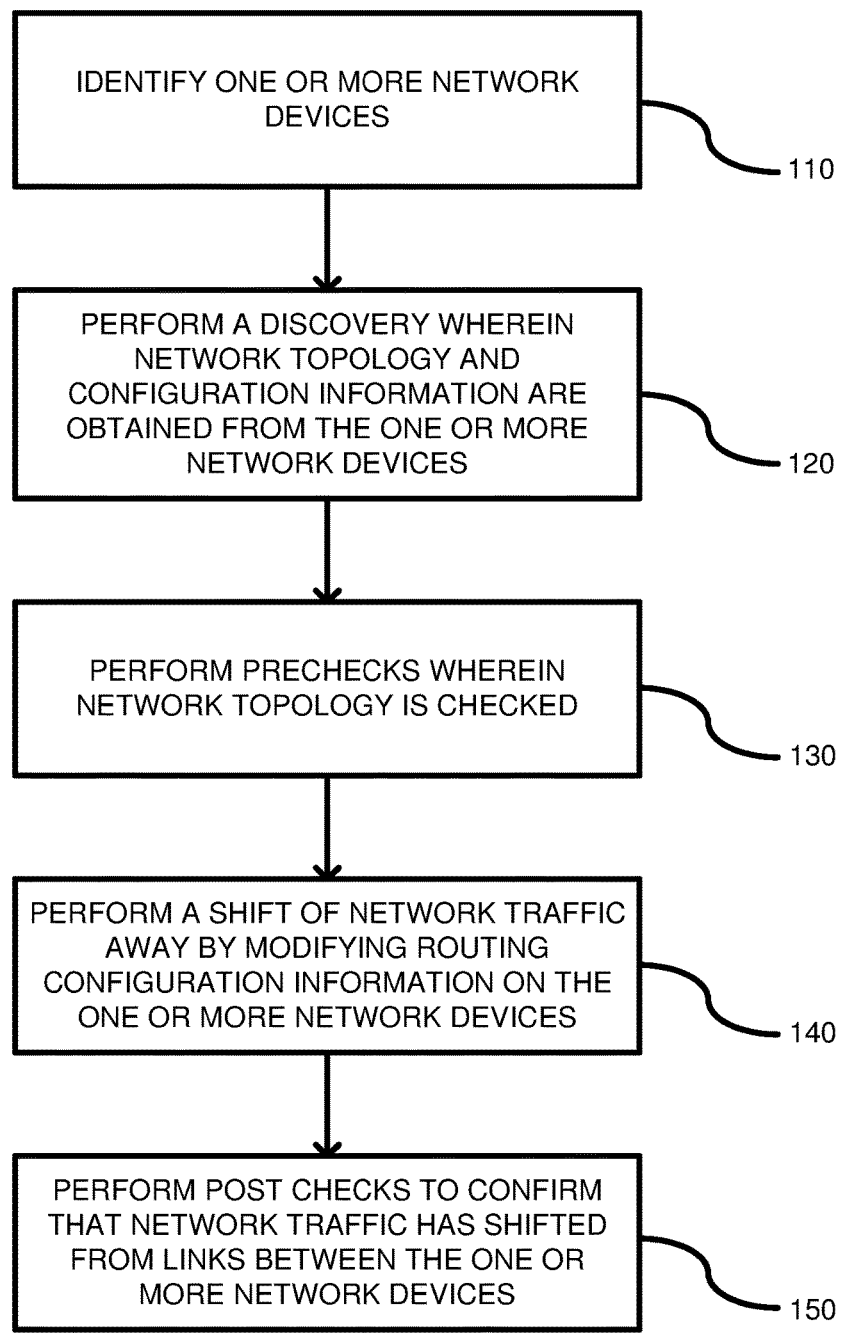
FIG. 1 is a flowchart of a method for shifting traffic away from one or more network devices in a network.

FIG. 1 shows each of the phases in turn. The process blocks of FIG. 1 can be executed by a server computer, such as a server computer within a service provider environment (e.g., a cloud environment). Process block 110 shows the identification phase, wherein one or more network devices are identified. In the case of a single network device, a single identification, such as a globally unique identifier (GUID) or an address can be used. In the case of a plurality of network devices, multiple identifiers can be used. The identifiers can be passed to a service performing the traffic shifting in the form of a text file, an API, or other means. Alternatively, a request can be made to the service that identifies two or more end points. For example, two data centers can be identified and a request made to remove all network interfaces used to establish links that are coupled between the two data centers. In such a case, the network devices associated with those data centers needs to be determined. There are multiple techniques for obtaining such information. For example, a list (e.g., an electronic text file) can be provided to the service, wherein the list includes all of the relevant network devices that are connected between the two end points. Alternatively, the service can request, from the service provider, a list of network devices associated with the end points. In any event, at the end of the identification phase, a list of one or more network devices is obtained.

In process block 120, a discovery phase is performed wherein local topology information and/or configuration information are obtained for one or more network devices. For example, the service can query each identified device for topology information or configuration information. Alternatively, the service can obtain such information from other services in the service provider. The topology information can include identifiers of neighbor network devices, neighboring router characteristics, network protocols being used, network devices joined by a segment, border router information, etc. Additional topology information can include active network interfaces (e.g., port channels being used) on each device, network protocols being used on those port channels, etc. Configuration information can include any stored parameters relating to how the network device is configured. For an Open Shortest Path First (OSPF) protocol, for example, configuration parameters can relate to cost, retransmit intervals, transmit delays, authentication, etc. The cost parameter allows other network devices to judge a network path's feasibility. For example, routers typically determine multiple candidate routes to a destination. Cost parameters stored in a router's configuration allow neighbor routers to determine which route is optimal. In other protocols, such as the Border Gateway Protocol (BGP), routing configuration can include weight parameters, local preference parameters, Autonomous System (AS) path parameters, etc. During the discovery phase, some identified devices can be removed from the list of devices for which traffic is to be shifted. For example, if neighbor information does not coincide between two connected devices, then one or more of these devices or interfaces on those devices can be removed from the list.

In process block 130, pre-checks are performed to detect any possible error conditions based, at least in part, on the information obtained during the discovery phase. A wide variety of pre-checks can be performed. For example, network topology information can be checked to ensure it is consistent across devices. The network topology information can include cross-checking network interfaces to determine if they each identify the other as neighbors. For example, if a network interface 1 on a router A identifies a network interface 2 on router B, then a check is determined to ensure that network interface 2 also identifies network interface 1 as a neighbor. If there is a match, then the pre-check is considered as passing, whereas if it fails, then the traffic shifting can be rolled back so that it does not occur. In such a situation, an error message can be transmitted to a customer so that a technician can investigate the error. Where two end points are identified, a further network topology check can be performed by comparing a number of network interfaces at one end point to a number of network interfaces at the other end point. The number of interfaces at each end point should match.

Another pre-check is to ensure that all of the cost parameters are consistent across the routers being shifted. For example, the OSPF protocol has a load balancing option called Equal Cost Multi Path (ECMP) wherein all routers have an equal cost parameter. Thus, the cost parameters of all the devices can be cross-checked to ensure that they are equal, and, if not, an error condition can be generated. Other pre-checks include checking a blacklist that can identify different network devices or different end points that are not to be taken off of the network. Such a blacklist can be provided by a customer or an administrator and can be accessible to the traffic shifting service. In still another pre-check, a capacity of the network can be checked to ensure that if the network device or set of network devices are removed from the network that the network can still operate. For example, if the routers are determined to be critical to the sustainability of the network, then the traffic shifting can be terminated. As such, an error condition can be initiated indicating that the remaining network devices after the traffic shifting have insufficient bandwidth to sustain current network traffic. In still another pre-check, a determination is made whether all the port channels are a same size (i.e., a same number of interfaces) and that the port channels are in the same operating state. For load balancing purposes, it is desirable that the network devices are operating in a similar way to have traffic shifted off of some of the devices.

In process block 140, assuming all of the pre-checks have passed, the shifting of network traffic can be performed. For example, network traffic can be shifted away from links coupled between data centers. From the discovery and pre-check phases, a final list of network devices, network interfaces, or links can be used for which network traffic is to be shifted. To shift network traffic, the network device or the set of network devices can have their routing configurations changed (such as on a network-interface basis) so as to ensure a high cost parameter (e.g., a maximum value) is associated with the network device or a policy changed. In either case, the network interface appears to neighbors as an undesirable option to route packets. In one example, a server computer can generate parallel processes, one for each network device, so that all of the network devices can be written in parallel (at substantially the same time) for modifying the configuration information. For example, if there are 20 routers at one end point, then a server computer can initiate 20 processes executing in parallel for writing cost configuration information to the routers in parallel and at substantially the same time. Continuing with the example, by writing the configuration information to the 20 routers at the same time, network traffic does not start to shift to any of the other 20 routers before their configuration information is changed. Once the costs parameters or policy parameters are written, they can be checked by reading the cost parameters or policy parameters back out of the devices and cross-checking that the expected value is read back. If any of the cost parameters or policy parameters are not equal to the values that were written, then an error condition can be generated wherein an administrator or customer is alerted. In some cases, where there are two end points, then each end point can be written in turn, so that a first end point is re-configured prior to a second end point.

In process block 150, a post check can be performed to confirm that the network traffic has been shifted from the one or more network devices. The traffic need not immediately go to zero. Rather, there can be a gradual shifting of the traffic as the new cost parameter is propagated to the neighbor devices. The post check can include checking at multiple predetermined time intervals to ensure that a quantity of traffic is meeting desired reduction thresholds. In one example, checks can be made every 30 seconds until the traffic volume has gone below a threshold level, such as zero or near zero. In another example, protocol status information can be checked to ensure that the routing configuration information has been updated. For example, cost parameters can be checked to ensure what is read back matches what was written.

Although the above embodiment is described using the OSPF routing protocol, other routing protocols can be used. For example, any interior gateway protocols (IGP) or exterior gateway protocols can be used (e.g., the BGP). Other example protocols include OSPF, Routing Information Protocol (RIP), Intermediate System to Intermediate System (IS-IS), Label Distribution Protocol (LDP), and Resource Reservation Protocol (RSVP). The network devices most typically include a router. A router, as described herein, includes hardware and software that communicatively interconnects other equipment on the network (e.g., other network elements, end stations). Some routers provide support for multiple networking functions (e.g., routing, bridging, switching, Layer 2 aggregation, session border control, etc.), and/or provide support for multiple application services (e.g., data, voice, and video). Routers typically include a control plane and a data plane (sometimes referred to as a forwarding plane). The control plane determines how data (e.g., packets) are routed (e.g., the next hop for the data and the outgoing port for that data), and the data plane forwards the data. The control plane can include one or more routing protocols that communicate with other routers to exchange routes and select those routes based on one or more routing metrics.

Routers implementing OSPF run a link state routing protocol that maintains an identical link state database (LSDB) describing the topology of the autonomous system (AS) in which it resides. Each record in the LSDB lists a particular network element's usable interfaces and reachable neighbors, adjacencies, or routes external to an area or AS. Neighboring routers are two routers that have interfaces to a common network, wherein an interface is a connection between a router and one of its attached networks. Moreover, an adjacency is a relationship formed between selected neighboring routers for the purpose of exchanging routing information and abstracting the network topology. One or more router adjacencies can be established over an interface. The adjacencies are established and maintained in OSPF through the use of a "Hello" protocol. The Hello protocol ensures that communication between neighbors is bi-directional by periodically sending Hello packets out of all of the network element interfaces. Bi-directional communication is indicated when the router sees itself listed in the neighbor's Hello packet.

Figure 2:
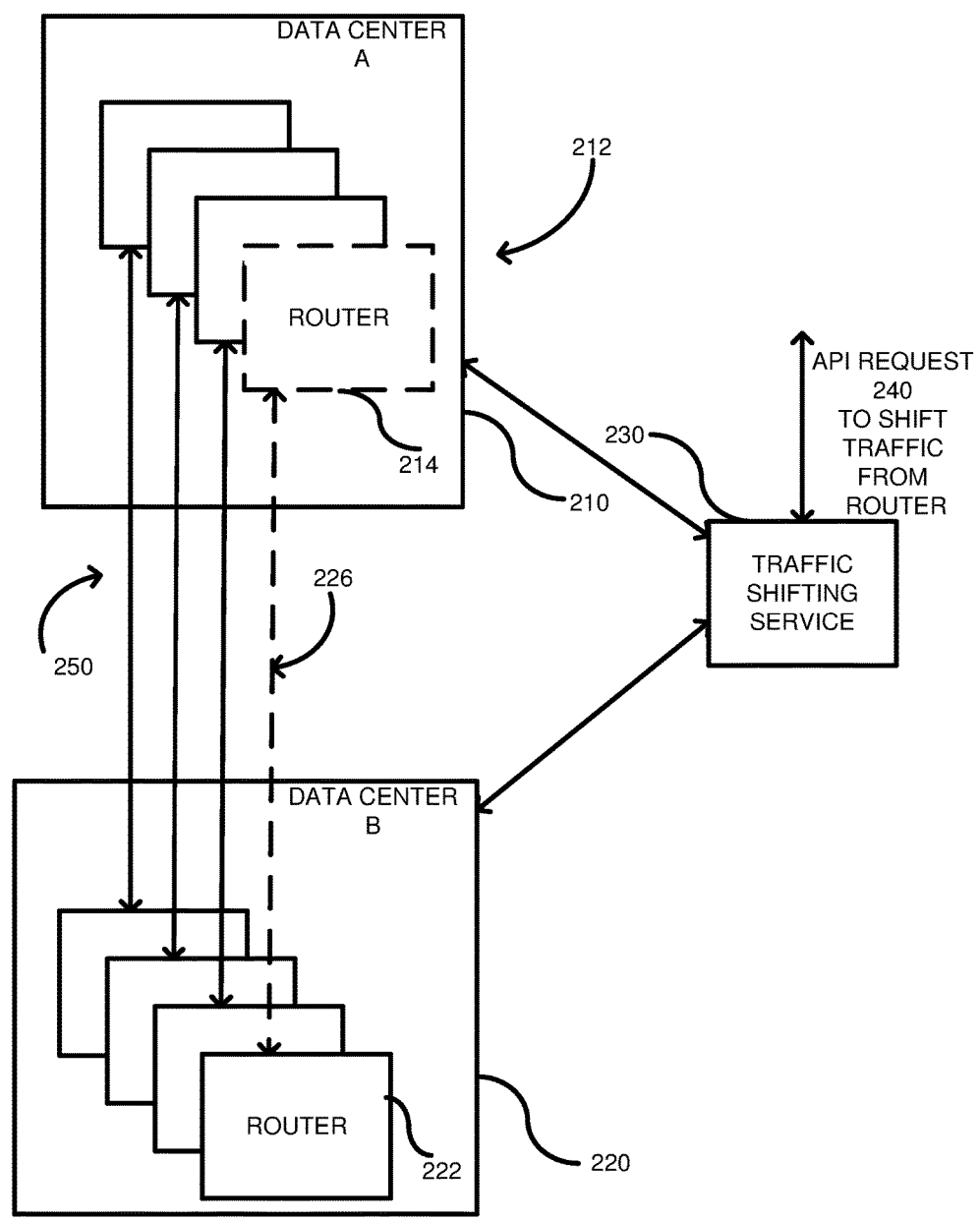
FIG. 2 shows a router network with multiple routers divided into different areas, wherein traffic is shifted away from one of the routers.

FIG. 2 shows an example wherein a single network device (in this case a router) is removed (for purposes of routing traffic) from a network through traffic shifting. In this example, a data center A, shown at 210, includes a plurality of routers shown at 212. A particular router of interest is a router 214, which is shown in dashed lines to indicate that it will be removed from the network. A data center B, shown at 220, also includes a plurality of routers, including a router 222 coupled via a link 226 to router 214. The link can include a physical cable (e.g., fiber optic) and any supporting software needed to establish a communication channel. In this case, removal of the router 214 removes all of the interfaces within the router 214 from the network, including a network interface supporting the link 226. A traffic shifting service 230 receives an Application Programming Interface (API) request 240 asking to remove router 214 from the network. In this example, once router 214 is removed, network traffic can still flow freely on other links, shown at 250, coupling the data centers 210, 220 together. However, a check can be made to determine if the links 250 have sufficient bandwidth to handle the network traffic once router 214 is removed.

For removal, router 214 can be identified as a router to be removed using an identifier of the router (e.g., an address) in the API request 240. Then, the router 214 can be queried for network topology information, such as by the host server computer 230, which can be performing the traffic shifting. The router 214 is shown having an interface open and coupled to router 222. This information can be cross-checked to ensure that router 222 has network topology information indicating that it is coupled to router 214. Other pre-checks can be performed as already described above, such as that all of the routers have similar cost parameters, have similar number of interfaces, etc.

Once the pre-checks have passed, then host server computer 230 can write new routing configuration information, such as a cost parameter (e.g., a maximum allowed cost parameter) or policy parameter to router 214. The other routers will then discontinue using router 214 and it can be safely removed from the network.

Figure 3:
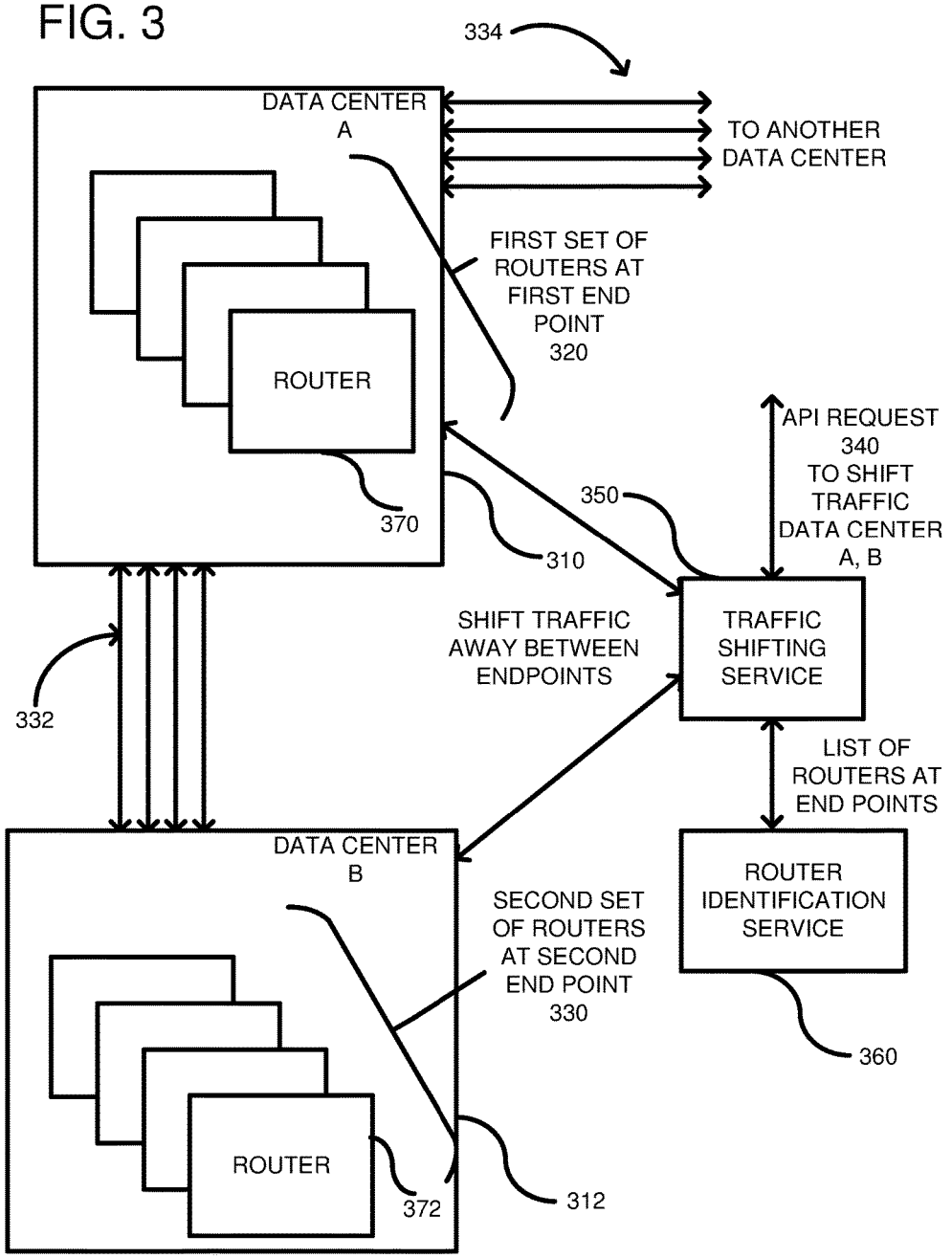
FIG. 3 shows multiple data centers with sets of routers communicating between the data centers, wherein traffic is shifted away from the sets of routers.

FIG. 3 shows an example wherein traffic shifting applies to two end points, such as between two data centers 310, 312. Each data center can include a set of one or more routers. For example, a first set of routers are shown at 320, while a second set of routers are shown at 330, with links 332 coupling the two together. The links 332 can include dedicated cables or optical fiber. The routers 320 are shown with other interfaces used to establish links 334 coupling the data center 310 to other data centers. An API request 340 can be made to a traffic-shifting service 350 wherein the two end points are identified. The identification can be a number, city, or any other desired identification. Prior to the discovery phase, the traffic shifting service 350 can make an API request using the endpoints to a router identification service 360, which transmits a list of the routers at the endpoints. Alternatively, the list of routers can be passed to the traffic shifting service in other ways, such as receiving a list directly from a customer. The list can include addresses or other identifiers for the service. The traffic-shifting service 350 can communicate with the data centers 310, 320 to obtain router topology or configuration information, as already described, for the routers in the list. During the discovery phase, the traffic shifting service 350 can identify the particular interfaces on the routers 320 that are used to establish the links 332. Additionally, during the discovery phase, the traffic shifting service 350 checks neighbor information and network interfaces to ensure that both are consistent between the endpoints. For example, a router 370 at endpoint 310 should have a network interface identified as coupled to router 372. Likewise, router 372 should have a network interface identified as coupled to router 370. Such cross-checking of network topology information for consistency assists in ensuring that traffic will be safely shifted before the shifting occurs. Once such pre-checks (which includes any of the pre-checks discussed in FIG. 1) are completed, the traffic shifting can occur by the traffic shifting service 350 by writing routing configuration information (e.g., a cost parameter, policy information, etc.) to the routers 320 in parallel processes so that the routers 320 are written at substantially the same time. The routing configuration information should be modified such that neighbor routers will want to choose alternative paths. For example, the cost parameter should be sufficiently high that neighbor routers will choose alternative paths. Once the routing configuration information is written to the routers in the Data Center A, the traffic shifting service 350 writes routing configuration information to the routers in Data Center B in parallel so that they are written at substantially a same time. Post checks can then be performed by the traffic shifting service 350 to ensure that traffic is shifted. The routers, such as routers 320, can have only the interfaces removed that support the links 332, while other interfaces remain operative, such as interfaces supporting links 334.

Figure 4:
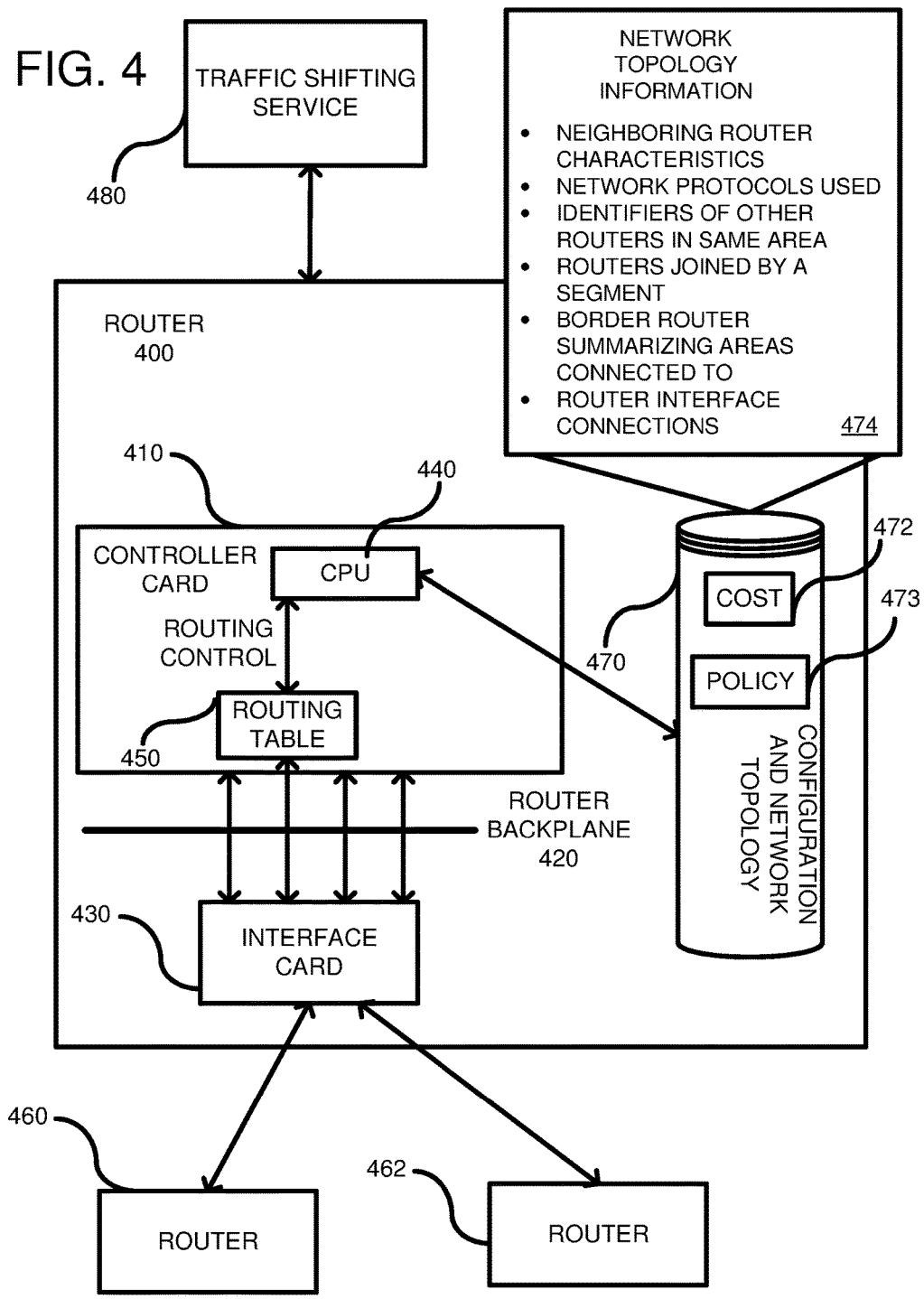
FIG. 4 shows an embodiment of a router architecture with configuration and network topology storage.

FIG. 4 shows further details of a router architecture. A router 400 includes a controller, such as a controller card 410, a router backplane 420 and one or more interfaces, such as interface cards 430. A CPU 440 is positioned on the controller card 410 and typically performs functions such as router table maintenance, path computations, and reachability propagation. The interface cards 430 include adapters for performing inbound and outbound packet forwarding. The router backplane 420 is responsible for transferring packets between the controller card and the interface cards. The basic functionality of the router 400 can include route processing and packet forwarding. A routing table 450 allows the router to create a view of the network's topology, which describes router relationships in a network, etc. For example, the router 400 is coupled to a network of other routers, such as is shown at 460, 462 (many other routers are generally included but not shown for simplicity).

Packet forwarding generally includes IP packet validation wherein the router checks that the packet is properly formed before processing the packet. The router can then perform a table lookup to determine an output port onto which to direct the packet, and a next destination to which to send the packet. The router can also adjust a time-to-live parameter to prevent circulation of packets that are too old. Finally, the router can perform an IP header checksum.

Router table lookup in the router table 450 is typically performed by the CPU 440 using the packet's IP destination address as a key. The lookup returns the best-matching routing table entry, which provides the interface and the IP address of the packet's next hop. The next hop address can be cached in a front-end routing table (not shown), which can be organized as a hash table.

The controller card 410 can also include storage (e.g., memory, hard drive, etc.) for a router configuration and network topology 470. The router configuration is independent of the routing table 450 and does not identify best routes to take through a router network. Thus, the router configuration is independent of the routing topology information. Instead, the router configuration can relate to interface settings or other characteristics or properties of the router (also called environmental parameters). Example configuration settings include speed (e.g., 10 megabits per second, 100 megabits per second, Auto mode, etc.), maximum transmission units (MTU) (maximum packet size), transmission modes (e.g., full duplex, half duplex, etc.), encapsulation types, interface types, load interval (the length of time used to calculate the average load on an interface), redirect message settings (if forced to resend a packet), setting up neighbors, adjacency, configuration of routing protocols, etc. A particular configuration of interest is a cost parameter 472. The cost parameter can be, for example, an OSPF cost that is then shared with neighbor routers to indicate the capacity of the router 400. Another configuration can be policy information, such as shown at 473. The policy information can include one or more parameters, such as routing-based policy information that impacts how neighbor devices route traffic. An example policy parameter can be associated with an external BGP peer or peer group. Modifying such BGP-based parameters can impact routing decisions.

The router topology information stored in the storage 470 is shown at 474 and can be separately received and can include information about the router network environment of which the router 400 is a part. The network topology information can include identifiers of other routers in the same area, routers currently joined by a segment (adjacency), border routers summarizing areas connected to, router interface information, etc. The network topology information can be a link-state database (LSDB) in some protocols, such as the OSPF protocol. In an example embodiment, the network topology information 474 may also include neighboring router characteristics and network protocol information. The neighboring router characteristics may provide information on one or more routers that are communicatively coupled to the router 400, such as hardware characteristics, type of router, ports used for outgoing or incoming communications, and so forth. The network protocols information may indicate the network communication protocol (or type of network traffic, such as Level 2, Level 3, etc.) used by the router 400 and/or any other router(s) communicatively coupled to router 400.

As previously described, a traffic shifting service 480 can read the topology information 474 and any of the configuration information stored in storage 470. The service 480 can further modify the cost parameter 472 or the policy information 473 so that other routers, such as routers 460, 462 redirect traffic through other paths.

Figure 5:
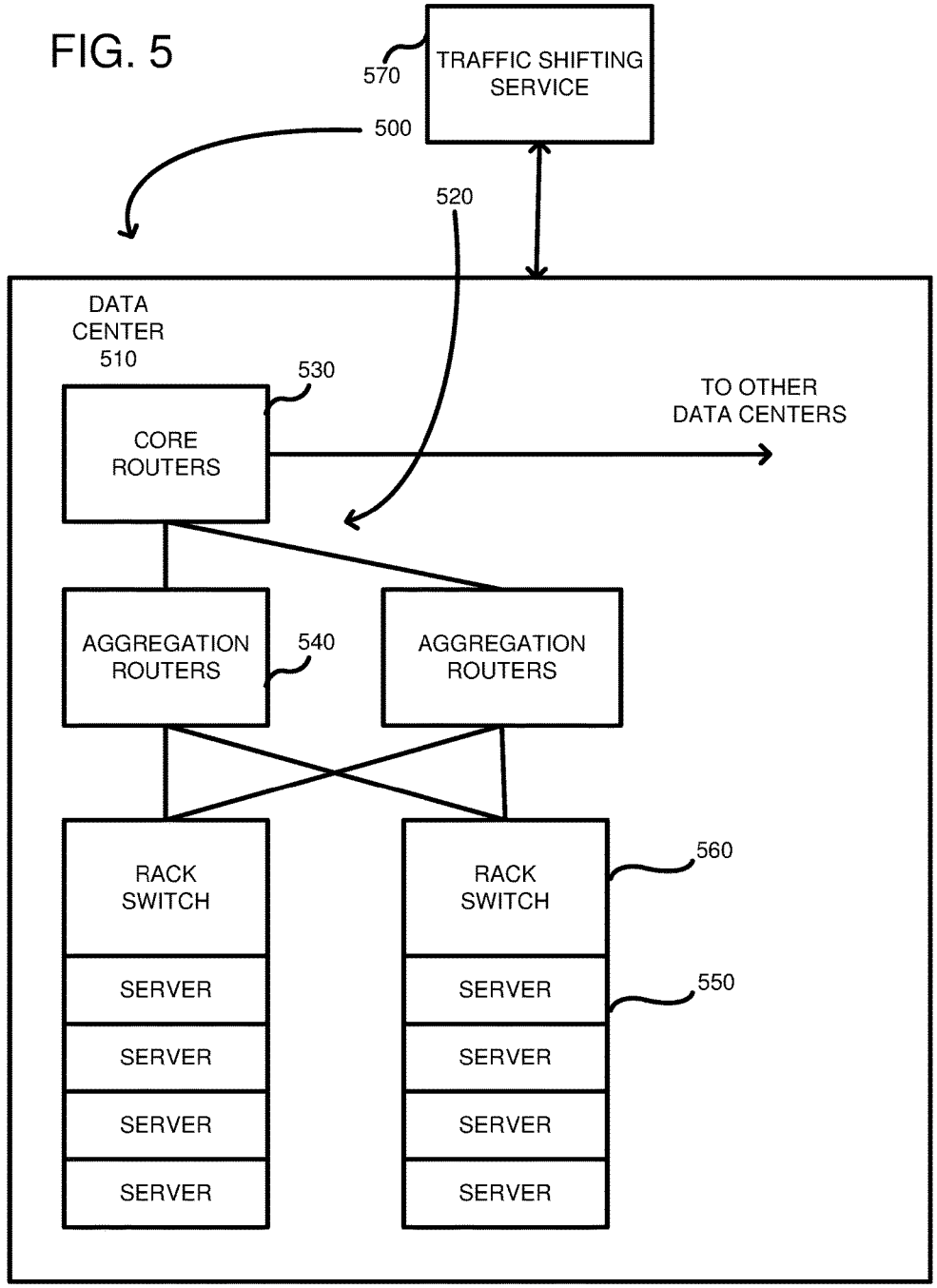
FIG. 5 shows an example of a plurality of routers in a data center, wherein the routers can have traffic shifted by a traffic shifting service.

FIG. 5 illustrates an environment 500 in which the network of routers can be used. In this example, the environment 500 includes a plurality of data centers including data center 510 coupled together by routers, shown generally at 520. Different levels of routers can be used. For example, core routers 530 can be coupled to other core routers in other data centers within a service provider environment. The routers 530 read address information in a received packet and determine the packet's destination. If the router decides that a different data center contains a host server computer, then the packet is forwarded to that data center. If the packet is addressed to a host in the data center 510, then it is passed to a network address translator (NAT) (not shown) that converts the packet's public IP address to a private IP address. The NAT also translates private addresses to public addresses that are bound outside of the datacenter 510. Additional aggregation routers 540 can be coupled to the NAT to route packets to one or more racks of host server computers 550. Each rack 550 can include a top-of-rack (TOR) switch 560 coupled to the multiple host server computers. Although one core router 530 and two aggregation routers 540 are shown, in a real data center there can be many more routers, and the routers can be grouped into areas as described herein. A traffic shifting service 570 can be coupled to the data center 510 to communicate with any of the routers or switches within the data center. Thus, any of the routers or switches can be coupled to other data centers and can have traffic shifted using the traffic shifting service 570.

Figure 6:
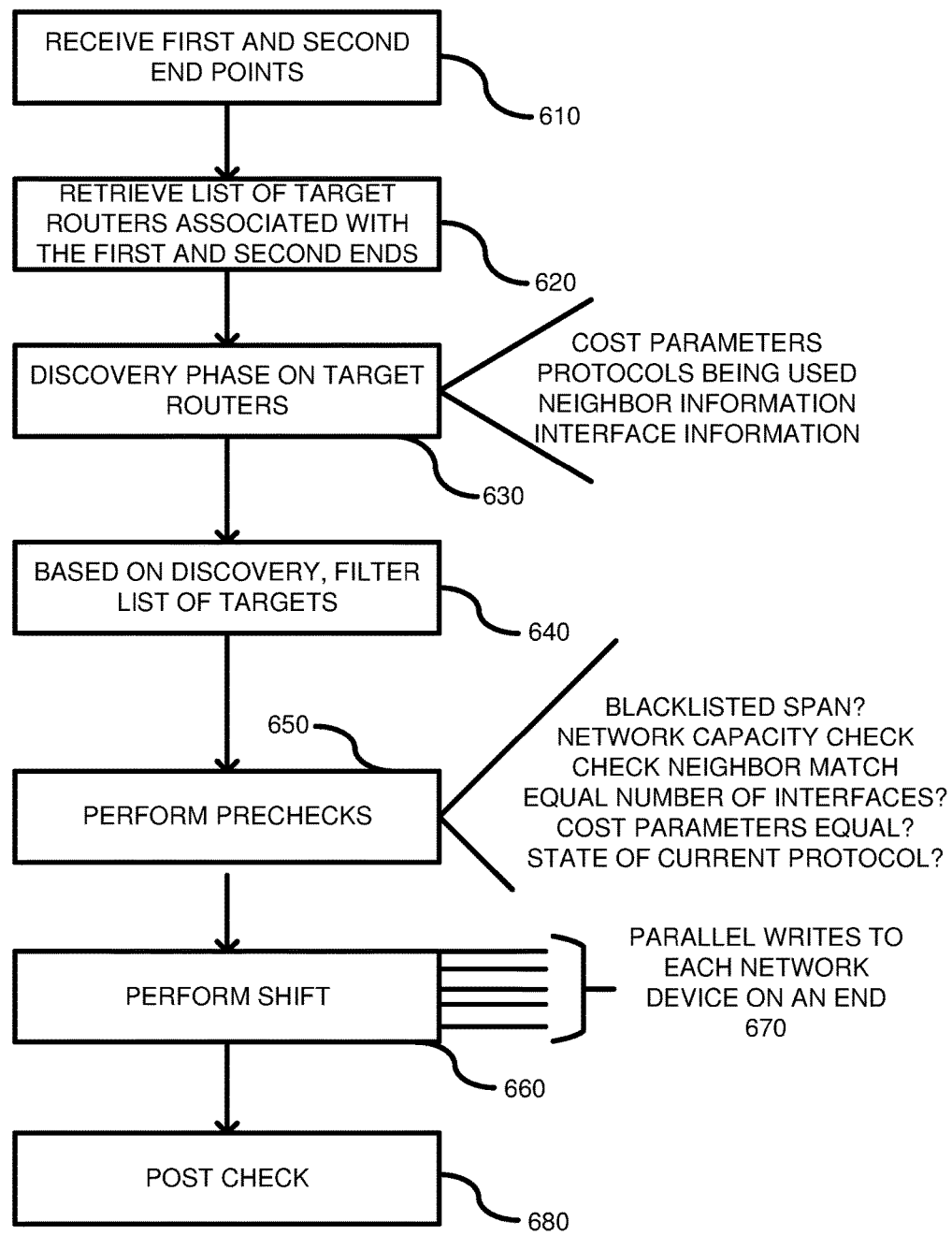
FIG. 6 shows a detailed flowchart according to one embodiment for shifting traffic away from a plurality of network devices.

FIG. 6 is a flowchart of a method for shifting traffic in network devices wherein at least two end points are provided. In process block 610, identification information is received for first and second end points. The endpoints can be datacenters or individual network devices. However, by having two endpoints, there are at least two network devices, with one network device at each end point. The request can be an API request to a traffic shifting service. In process block 620, a list of target routers (or other network devices) associated with the first and second end points can be retrieved. The list can be provided by a service of a service provider that maintains such a list. Alternatively, the list can be provided with the original request to the traffic shifting service. There are multiple techniques that can be used by a traffic shifting service in order to obtain address information for routers at the first and second end points and any such technique can be used.

In process block 630, a discovery phase is initiated on the target routers. The discovery phase can include the target shifting service querying the identified routers for configuration information and network topology information. Example information can include cost parameters, policy parameters, protocols being used, neighbor information, interface information, etc. For example, the interface information can be used to determine links connecting the end points together for purposes of transmitting network traffic. Thus, during the discovery phase, the target shifting service can interrogate the routers to retrieve stored status and data information therefrom. In process block 640, pre-checks can be performed using the discovery information. Example pre-checks can include checking whether the network span between the endpoints is on a blacklist, such that it is not movable. For example, both end points can be checked against a stored list and if the endpoints match the span on the list, then an error condition can be initiated. Other pre-checks include a network capacity check wherein the target shifting service checks whether the network can maintain its current bandwidth without the network span. Still further, network-interface based information can be checked. For example, the target shifting service can cross-check neighbor network interfaces to ensure that they are consistent. Yet still further, the target shifting service can check whether a number of interfaces is equal on each of the first and second ends for the span between those ends. A further check can be based on current configuration parameters, such as a determination whether the cost parameters are equal.

In process block 650, based on the discovery phase, the target shifting service can filter some of the list of target routers so as to reduce the list. For example, any of the target routers that do not pass the pre-check phase can be removed from the set of routers for which traffic shifting will occur. After the filtering, a final list of routers is obtained for which traffic shifting occurs. In process block 660, traffic shifting occurs. As indicated at 670, parallel writes can be used to write cost configuration information to each network device. Alternatively, writes can occur in other desired sequences, such as in series, or a combination of some of the devices in parallel and some in series. Parallel writing of devices ensures that the entire network span slows at a similar period of time. In process block 680, a post check is performed wherein the traffic shift service can query the network devices to ensure that traffic is indeed slowing down. A volume of traffic can be compared to predetermined levels and if the traffic volumes still continue, then an error message can be transmitted. Otherwise, the network device can be safely removed from the network.

Figure 7:
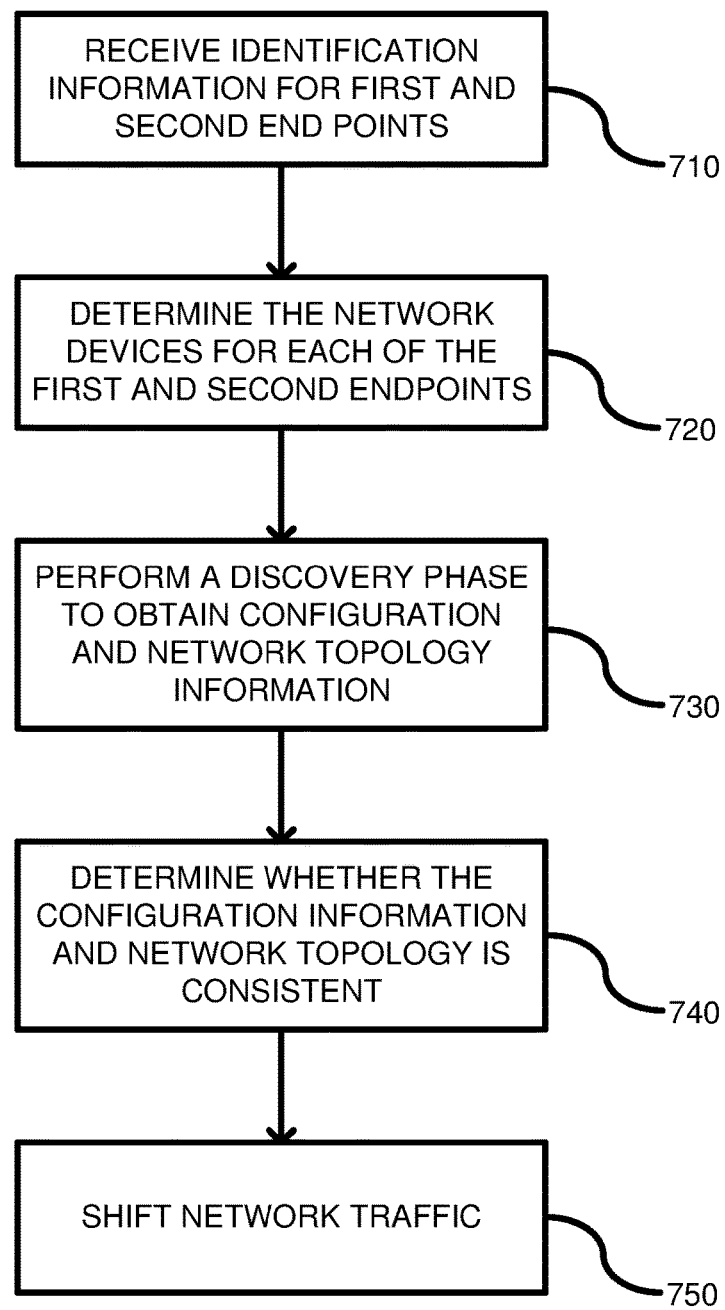
FIG. 7 shows a flowchart according to another embodiment for shifting traffic away from a plurality of network devices.

FIG. 7 is a flowchart according to another embodiment for traffic shifting. In process block 710, an identification can be received for first and second end points. The identification can be for a physical location, rather than specific identification of network devices for which traffic shifting is to occur. However, in process block 720, from the physical location, the network devices associated with that location can be derived, such as by requesting another service for the network devices at that physical location. Using such a service, identification information (e.g., addresses) can be obtained for a plurality of network devices at each end point. In process block 730, a discovery phase is performed wherein the identified network devices are queried for configuration information and network topology information. Each of the configuration information and network topology information are typically stored information on each network device. In process block 740, a determination is made whether the configuration information and the network topology information is consistent. Thus, a check is made whether neighbor devices have information that is the same or does not conflict with the information obtained on another network device. In one example, the cost parameters should be the same across all devices and if the cost is not the same, an error condition exists. In another example, the network topology information is cross-checked to see if each device sites a corresponding device as a neighbor, as opposed to one device identifying a device as a neighbor, whereas the neighbor device does not. In process block 750, network traffic is shifted. Such a shifting occurs through increasing a cost parameter on each device that has a network interface connecting the first and second end points. Other techniques can be used for shifting the network traffic, such as changing any of the policy information that impacts routing decisions. The shifting of network traffic can be on an interface basis so that traffic can be shifted from one router interface, while other interfaces on the same router remain active.

Figure 8:
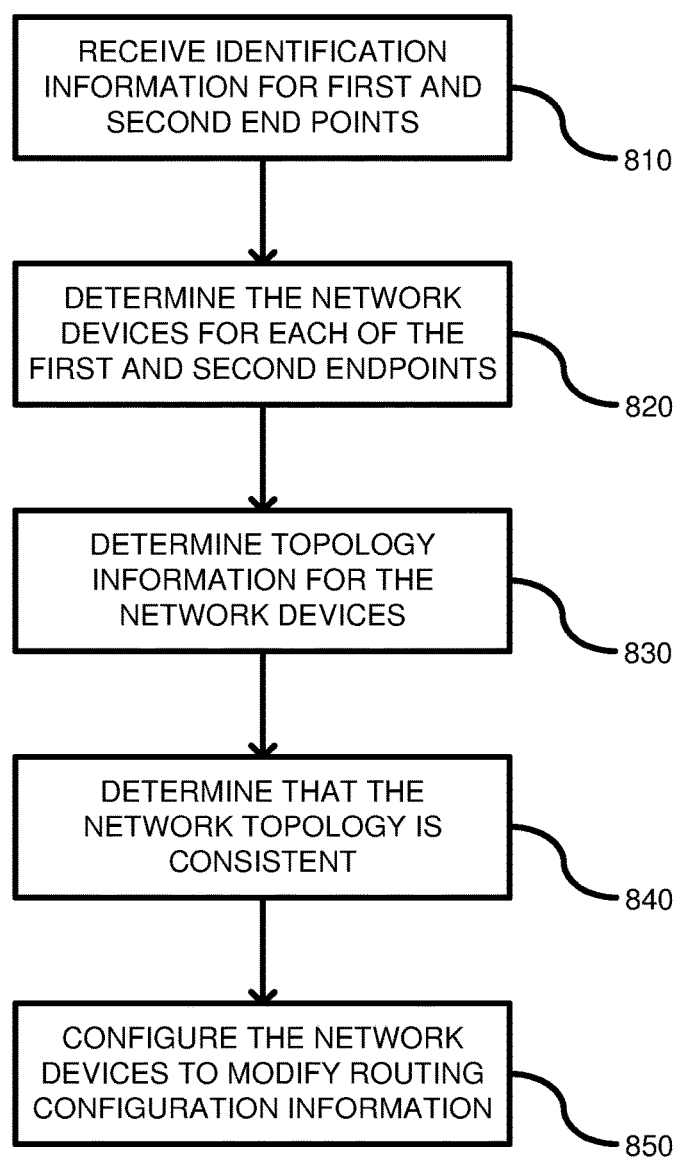
FIG. 8 shows a flowchart according to yet another embodiment for shifting traffic away from a plurality of network devices.

FIG. 8 shows a flowchart of a method according to another embodiment. In process block 810, identification information is received for first and second end points. The identification information can be a physical location or other identification information. In process block 820, network devices associated with the first and second end points are determined. The network devices are typically a set of multiple routers that have interfaces connecting the first end point to the second end point.

In process block 830, a query is made of the identified network devices for topology information. The topology information can include neighbor information of the identified network devices. In process block 840, the network topology is cross-checked for consistency. Thus, if a first network device identifies a second network device as a neighbor, then the second network device should also identify the first network device as a neighbor. In process block 850, the network devices can be configured so that routing configuration parameters are modified to make routing packets to the network devices undesirable. In one example, the cost parameter is modified and the cost parameter is propagated to neighbor devices, the result of which is that traffic is shifted away from the network devices with high cost.

Figure 9:
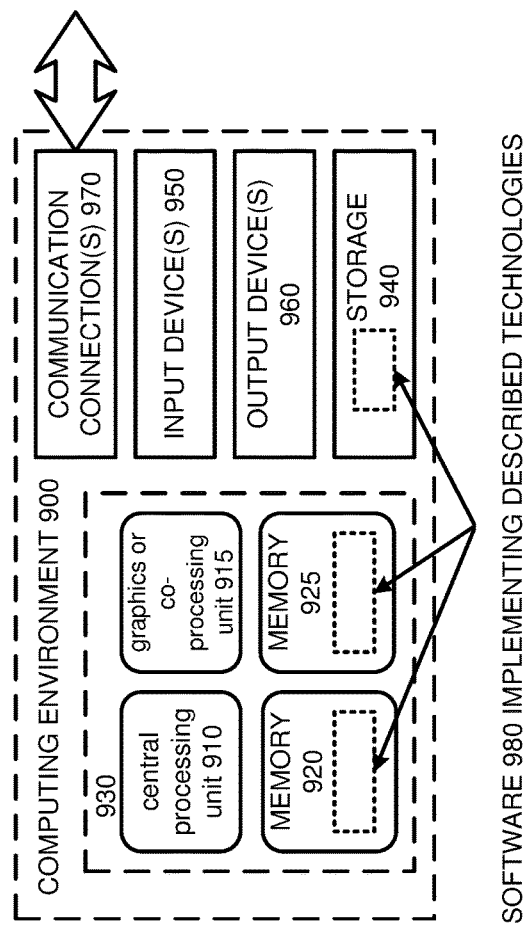
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices and can be used as the traffic shifting service.

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Still further, components described as "coupled" together include components directly connected or indirectly connected, such as when one or more intermediate components are inserted there between.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of shifting traffic from links between network devices, the method comprising:
    receiving identification information for first and second end points at first and second data centers, respectively, wherein the first end point includes a first set of network devices and the second end point includes a second set of network devices and wherein the received identification information is within a request to shift traffic between the first and second end points;
    determining the first set of network devices and the second set of network devices at each of the first and second end points, respectively;
    by a traffic shifting service executing on a server computer, performing a discovery phase wherein the determined network devices are queried for routing configuration information and network topology information;
    by the traffic shifting service, determining whether the network topology information and the routing configuration information are consistent between the first and second sets of network devices by cross-checking the routing configuration information between the first and second sets of network devices;
    for a first network device of the first set of network devices and a second network device of the second set of network devices that do not have consistent network topology information and routing configuration information, removing the first and second network devices from the first and second sets of network devices; and
    shifting network traffic from the links between the first set of network devices and second set of network devices by changing routing configuration information stored on the first set of network devices and the second set of network devices.

2. The method of claim 1, wherein the network topology information includes identification of neighbor network devices that are connected to the queried network devices.

3. The method of claim 2, wherein determining whether the network topology information is consistent includes checking that network topology information on the neighbor network devices is not conflicting with the network topology information on the queried network devices.

4. The method of claim 1, wherein determining the network devices includes receiving a list of identifications of network devices associated with the first and second end points.

5. The method of claim 1, wherein the performing of the discovery phase includes executing parallel processes that query the determined network devices in parallel.

6. A computer-readable storage medium including instructions that upon execution cause a computer system to:
receive identification information for first and second end points;
determine a first set of network devices at the first end point;
determine a second set of network devices at the second end point, wherein the first set of network devices have first interfaces connected to second interfaces on the second set of network devices with links coupling the first set of network devices to the second set of network devices;
determine network topology information for the first and second sets of network devices;
determine whether the network topology information is consistent across the first and second sets of network devices by checking whether the first and second sets of network devices have neighbor information that does not conflict;
remove any network devices within the first and second sets of network devices that have neighbor information that does conflict; and
configure the first and second sets of network devices to modify routing configuration information stored in each network device so as to shift network traffic away from the links.

7. The computer-readable storage medium according to claim 6, wherein the instructions, upon execution, further cause the computer system to:
determine interfaces on each of the network devices that are used to connect the first end point to the second end point and wherein the shifting away of the traffic is on only the determined interfaces of the network devices.

8. The computer-readable storage medium according to claim 6, wherein the network topology information includes neighbor network devices connected to the first and second sets of network devices.

9. The computer-readable storage medium according to claim 6, wherein the determining that the network topology information is consistent includes ensuring that neighbor information between the first and second sets of network devices is consistent.

10. The computer-readable storage medium according to claim 6, wherein modifying the routing configuration information includes modifying routing policy or increasing a cost parameter on a per-interface basis in the network devices and only for interfaces associated with a link between the first and second end points.

11. The computer-readable storage medium according to claim 6, wherein the configuring comprises writing the cost parameters to each of the network devices in the first set in parallel and at substantially a same time and writing the cost parameters to each of the network devices in the second set in parallel and at substantially a same time.

12. The computer-readable storage medium according to claim 6, wherein the instructions, upon execution, further cause the computer system to:
after the configuring, and after a predetermined period of time, check network traffic between the first and second end points to ensure that the network traffic has dropped below a threshold level.

13. The computer-readable storage medium according to claim 6, wherein the instructions, upon execution, further cause the computer system to:
check that network capacity including a current bandwidth is unchanged once the network traffic is shifted away from the first and second end points.

14. The computer-readable storage medium according to claim 6, wherein the instructions, upon execution, further cause the computer system to:
query the first and second sets of network devices for current cost settings and determine that the cost settings are equal.

15. The computer-readable storage medium according to claim 6, wherein receiving of the identification information includes receiving physical location information associated with the first and second end points.

16. A system, comprising:
a first set of network devices within a first data center;
a second set of network devices within a second data center, wherein the first set of network devices and the second set of network devices have communication paths there between for establishing a network connection;
a server computer executing within the service provider, the server computer operable to perform the following:
query the first set of network devices for first neighbor information;
query the second set of network devices for second neighbor information; check that whether the first neighbor information and second neighbor information match for network connections between the first and second data centers;
remove network devices from the first set and second set where the first neighbor information and the second neighbor information do not match; and
write routing configuration information to the first set and second set of network devices.

17. The system of claim 16, wherein the configuration information includes policy or cost information, and wherein the server computer writes the configuration information to the network devices at substantially a same time.

18. The system of claim 16, wherein the server computer is a first server computer and further including a second server computer executing in the service provider, the second server computer for providing identification information of the first set of network devices and the second set of network devices to the first server computer.

19. The system of claim 16, wherein the server computer is further operable to perform a query of current cost parameters of the first and second sets of network devices to ensure that the cost parameters match.

20. The system of claim 16, wherein the network devices are routers and the writing of the routing configuration information includes writing cost parameters.

* * * * *